United States Patent [19]
Haggerty et al.

[11] Patent Number: 5,427,336
[45] Date of Patent: Jun. 27, 1995

[54] DUAL CONTROL MECHANISM FOR AIRCRAFT

[76] Inventors: Matthew K. Haggerty, 25 Center St., Milton, Mass. 02186; Clay A. Burns, 2 Goodwin Pl., Apt. #1, Boston, Mass. 02114

[21] Appl. No.: 21,752
[22] Filed: Feb. 24, 1993
[51] Int. Cl.⁶ .......................................... B64C 13/12
[52] U.S. Cl. ................................. 244/229; 244/234; 74/471 R; 74/493
[58] Field of Search ............... 244/229, 234, 235; 74/471 R, 471 XY, 493, 543

[56] References Cited

U.S. PATENT DOCUMENTS

| | | |
|---|---|---|
| D. 135,167 | 3/1943 | Obszarny . |
| 792,573 | 6/1905 | Duryea . |
| 1,798,724 | 3/1931 | Chalmers . |
| 1,807,939 | 6/1931 | Sikorsky . |
| 1,855,988 | 4/1932 | Ranasey . |
| 1,874,522 | 8/1932 | Henrichsen ............... 244/234 |
| 2,272,817 | 2/1942 | Palmer ............... 244/229 |
| 3,228,478 | 1/1966 | Edenborough . |
| 3,271,045 | 9/1966 | Vacante . |
| 3,941,009 | 3/1976 | Brown ............... 74/543 |
| 3,994,453 | 11/1976 | Firestone . |
| 4,114,843 | 9/1978 | Robinson . |
| 4,726,311 | 2/1988 | Niina ............... 74/493 |
| 4,811,921 | 3/1989 | Whitaker et al. ............... 244/234 |
| 4,887,782 | 12/1989 | Carnell et al ............... 244/234 |

FOREIGN PATENT DOCUMENTS

| | | |
|---|---|---|
| 962426 | 6/1950 | France ............... 244/229 |
| 997200 | 1/1952 | France ............... 244/229 |
| 471583 | 11/1937 | United Kingdom . |

Primary Examiner—Galen L. Barefoot

[57] ABSTRACT

A control mechanism for aircraft having a vertically extending, short stub with a cross bar attached to its upper end and a pair of arcuate lower members extending from the cross bar toward the forward end of the aircraft with an adjustable positioning arm on each lower member extending rearwardly and which mounts a hand grip for controlling the aircraft. In a single control mechanism, one arcuate lower member is attached directly to the stub.

19 Claims, 5 Drawing Sheets

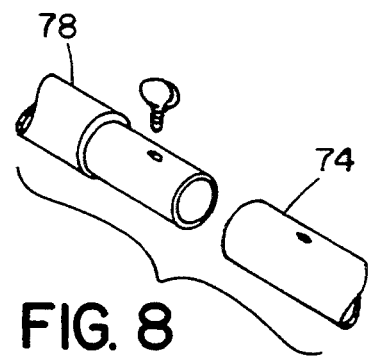
FIG. 8
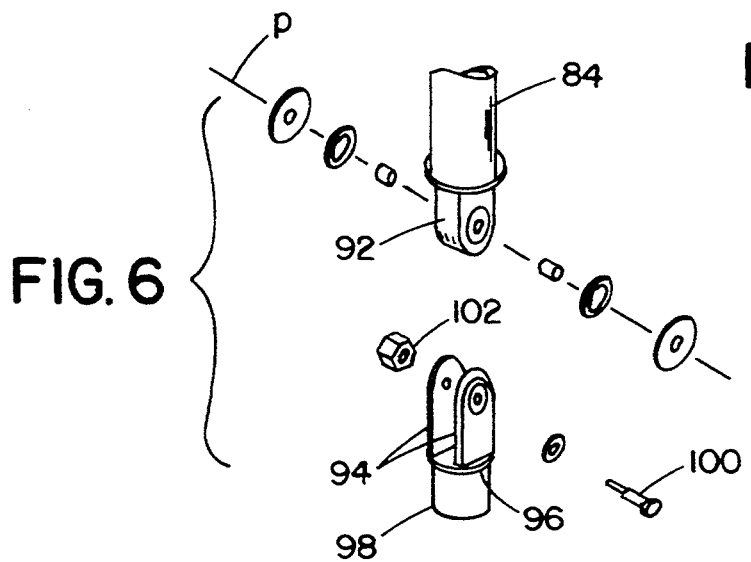
FIG. 6
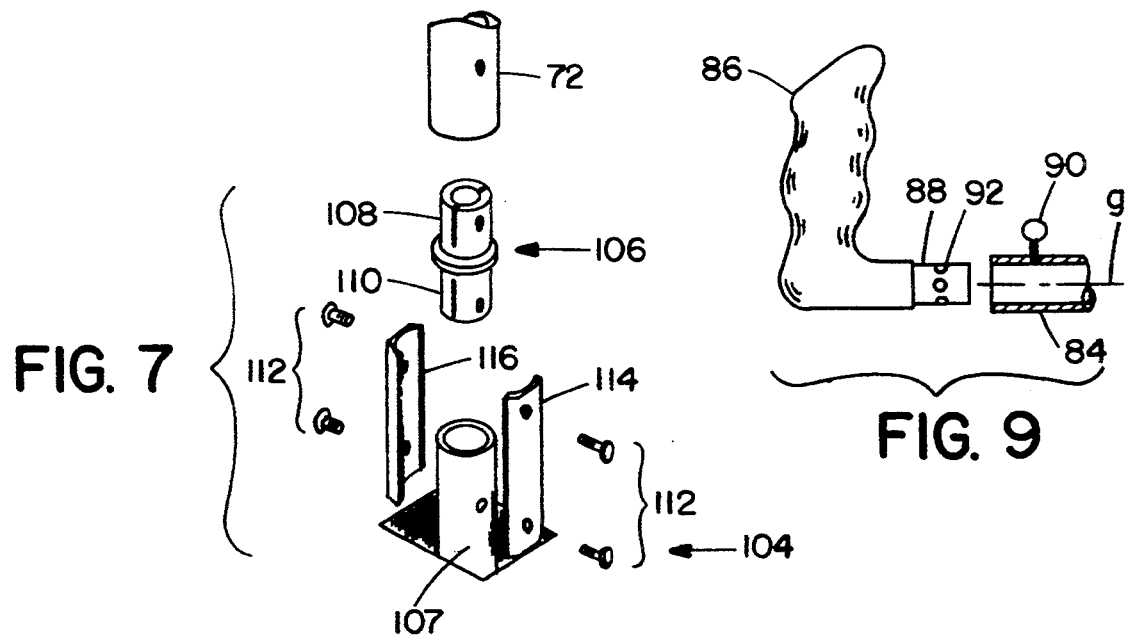
FIG. 7
FIG. 9

DUAL CONTROL MECHANISM FOR AIRCRAFT

BACKGROUND OF THE INVENTION

This invention relates to control mechanism for aircraft, more particularly to a single or dual control system operating through a single stick.

There are numerous control mechanisms today for operating the elevator and ailerons of fixed wing aircraft and/or for controlling the cyclic pitch of the rotor of a helicopter. In a single passenger aircraft, the stick is located in front of the pilot and his knees normally straddle the stick. The same is true of dual passenger tandem aircraft. In dual control aircraft where the pilot and copilot or pilot and passenger are seated side by side, each has a stick normally extending upwardly from linkage mechanism below the floor level.

One of the problems with the latter arrangement, i.e., where a pilot and copilot sit side by side, is the need for a relatively complex mechanism to interconnect the two control sticks so that they can move together in side by side and fore and aft directions simultaneously. Another problem is that the vertically extending stick makes access to the aircraft somewhat difficult.

These and other problems were addressed in U.S. Pat. No. 4,114,843, which issued Sep. 19, 1978 to Robinson. Robinson disclosed a control mechanism mounted on the center line of the aircraft for the dual control of aircraft having a single vertically extending stick for controlling both longitudinal and lateral orientation of the aircraft. A cross bar was secured to the stick which was connected to a single axis rotational joint permitting both fore and aft and lateral movement of the aircraft by grips located on both ends of the cross bar. The rotational joint, in turn, was connected to mechanism for moving the ailerons, elevator or for controlling the rotor blades of a helicopter.

The cross bar was hinged on the upper end of the stick and was freely pivotal in a vertical plane extending transversely to the axis of the aircraft. The grips, which were mounted on the ends of the cross bar, extend downwardly toward the cockpit floor.

While the Robinson control Stick assembly solved many of the problems associated with older constructions of dual controls, the central, upwardly extending stick prevented complete access to the main instrument panel controls. It and the cross bar as mounted impaired visibility of the main instrument panel displays, and inhibited accessibility to the panel controls and instruments. The fact that the cross bar pivoted up and down permitted one grip to be located at a convenient place for one of the two pilots, but in instances where the grip were near the pilot's lap, the other grip, by necessity, would be elevated to a position away from the immediate comfortable access position of the other pilot. In the instance where both pilots have their hands on the grip, as for example, in a teaching process, with one grip elevated and the other one depressed, either or both of the pilots could have their hands in an uncomfortable position.

It is to these problems that the present invention is directed.

SUMMARY OF THE INVENTION

The present invention resides in a control mechanism to effect lateral and longitudinal movement of an aircraft of either the fixed or rotary wing type. The invention will be illustrated with respect to a rotary wing aircraft which will be defined, in part, as having a forward end, a rearward end and a central axis as reference data. A short stub extends vertically upwardly from the floor or a portion of the cockpit close to the floor and is located essentially on the central axis of the aircraft between the pilot and copilot seats which are side by side on opposite sides of the axis. The lower end of the stub is engagable with conventional aircraft control means such as a rudder, ailerons, cyclic control mechanism, etc. A cross bar is secured to the upper end of the stub which is close to the floor and extends transversely of the central axis extending from the stub outwardly in both directions.

A pair of arcuate lower members are attached to and extend from the cross bar, one on each side of the axis of the aircraft. The lower members extend toward the forward end of the aircraft substantially parallel with the axis. They then curve upwardly and terminate in a distal end. A positioning arm is pivotally secured to the distal end of each lower member and extends toward the rearward end of the aircraft. A pilot handgrip is secured to each positioning arm.

The positioning arms are pivotally mounted, each to its own associated lower member, to permit independent heightwise adjustment of each handgrip relative to the level of the cross bar to make its height independent of the height of the other grip.

The hand grips may each be pivotally mounted on its associated positioning arm to permit independent angular adjustment of the grip relative to axes parallel with the central axis of the aircraft.

This structure also provides planar motion of the grip through full arc travel of the stick and also allows full clearance of grip positioning arm from legs.

At least one of the arcuate lower members may be releasably secured to the cross bar to permit its removal and, optionally, both may be releasably secured to permit greater access to the cockpit for cleaning, etc.

The pivoted arm may be attached to the stick of a single control. The pivoted positioning arm on the single conventional stick also allows planar motion of the grip through the full arc travel of the stick.

Normally, the pivoted arm will descend toward the floor under its own weight. The present invention contemplates providing a counterbalance for the arm where it is on a single or dual control mechanism.

Other advantages are: improved access to cockpit, pilot comfort and reduced fatigue, planar motion of grip, ability to move grip around legs and other obstacles to full travel of control stick.

The above and other features of the invention including various and novel details of construction and combination of parts will now be more particularly described with reference to the accompanying drawings and pointed out in the claims. It will be understood that the particular control mechanism for aircraft embodying the invention is shown by way of illustration only and not as a limitation of the invention. The principles and features of this invention may be employed in varied and numerous embodiments without departing from the scope of the invention.

BRIEF DESCRIPTION OF THE DRAWINGS

FIG. 6 is an exploded detail view of a pivot mechanism for adjustably joining the positioning arms to the lower members.

FIG. 7 is an exploded detail view of mechanism for securing the stub to the aircraft control means.

FIG. 8 is an exploded detail view of means for releasably securing one of the lower members to the cross bar.

FIG. 9 is an exploded detail view of means for pivotally mounting the grip on the positioning arm.

DETAILED DESCRIPTION OF THE INVENTION

Figure 1:
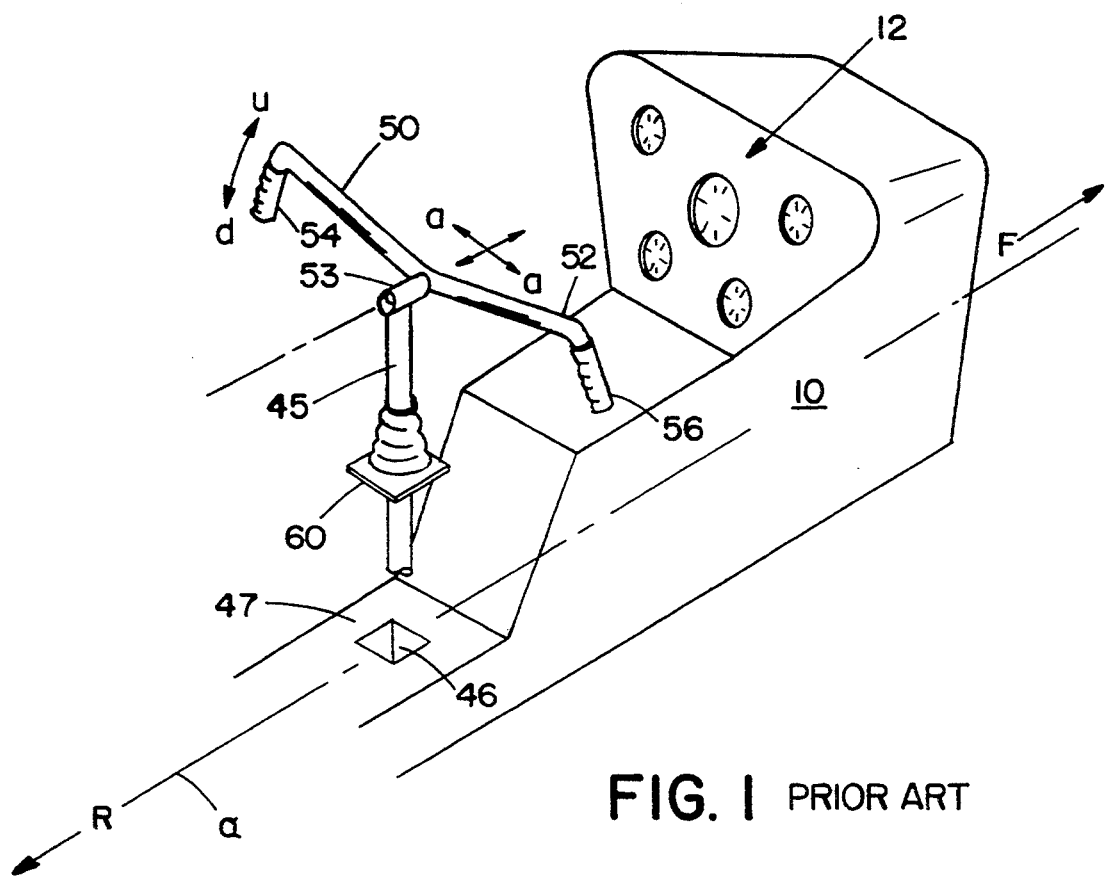
FIG. 1 is a perspective view of a dual control mechanism illustrating the prior art.

FIG. 1 is a representative illustration of a prior art dual control mechanism of the type disclosed in U.S. Pat. No. 4,114,843 to Robinson. It includes an instrument console generally designated 10 located on a central axis e which is the axis of the aircraft which, in turn, has a forward end in the direction of the arrow designated F and a rearward end in the direction of an arrow designated R. The same nomenclature will be employed with reference to the illustrative example of the present invention.

Figure 3:
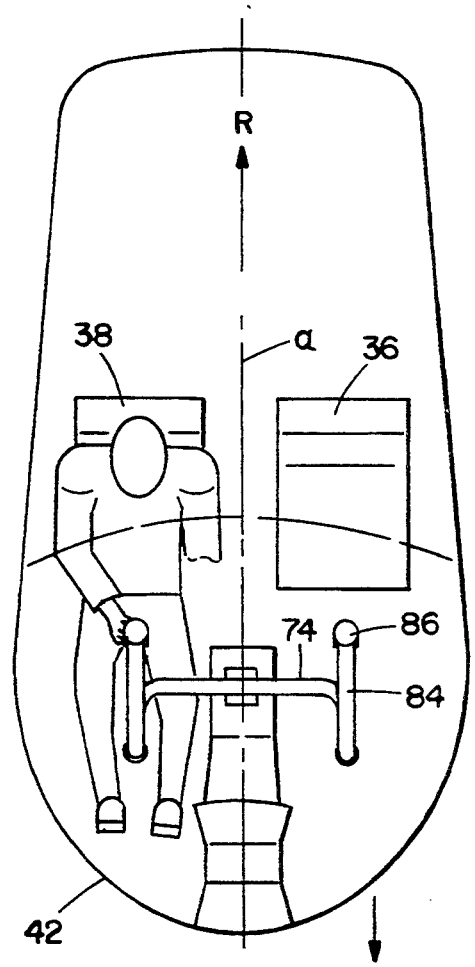
FIG. 3 is a plan schematic view of the dual control mechanism in a helicopter.
Figure 4:
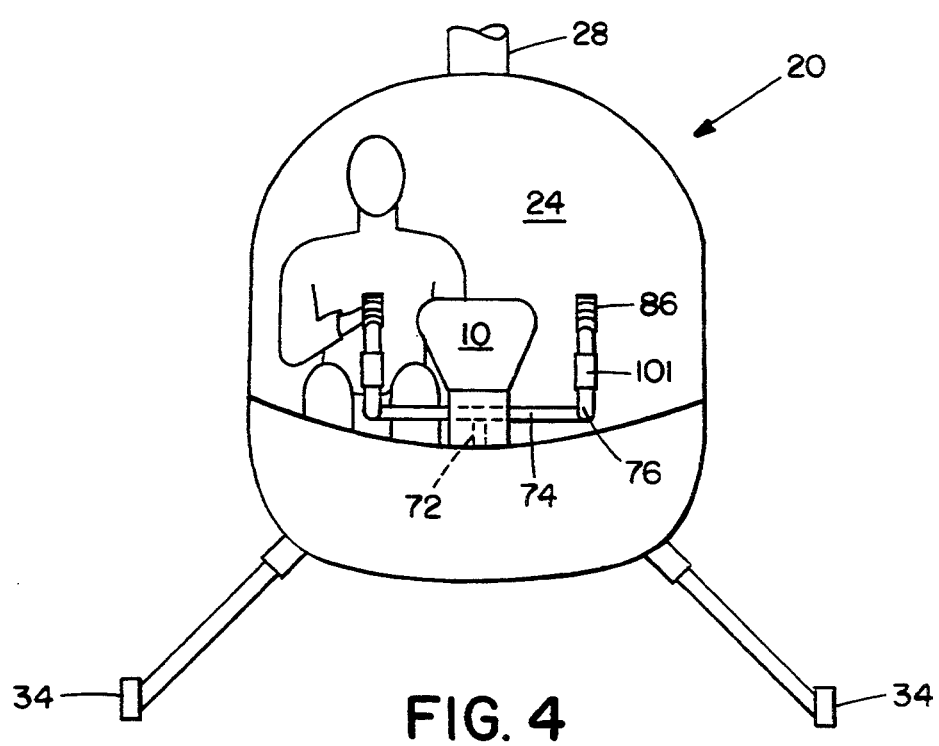
FIG. 4 is a front view thereof.
Figure 5:
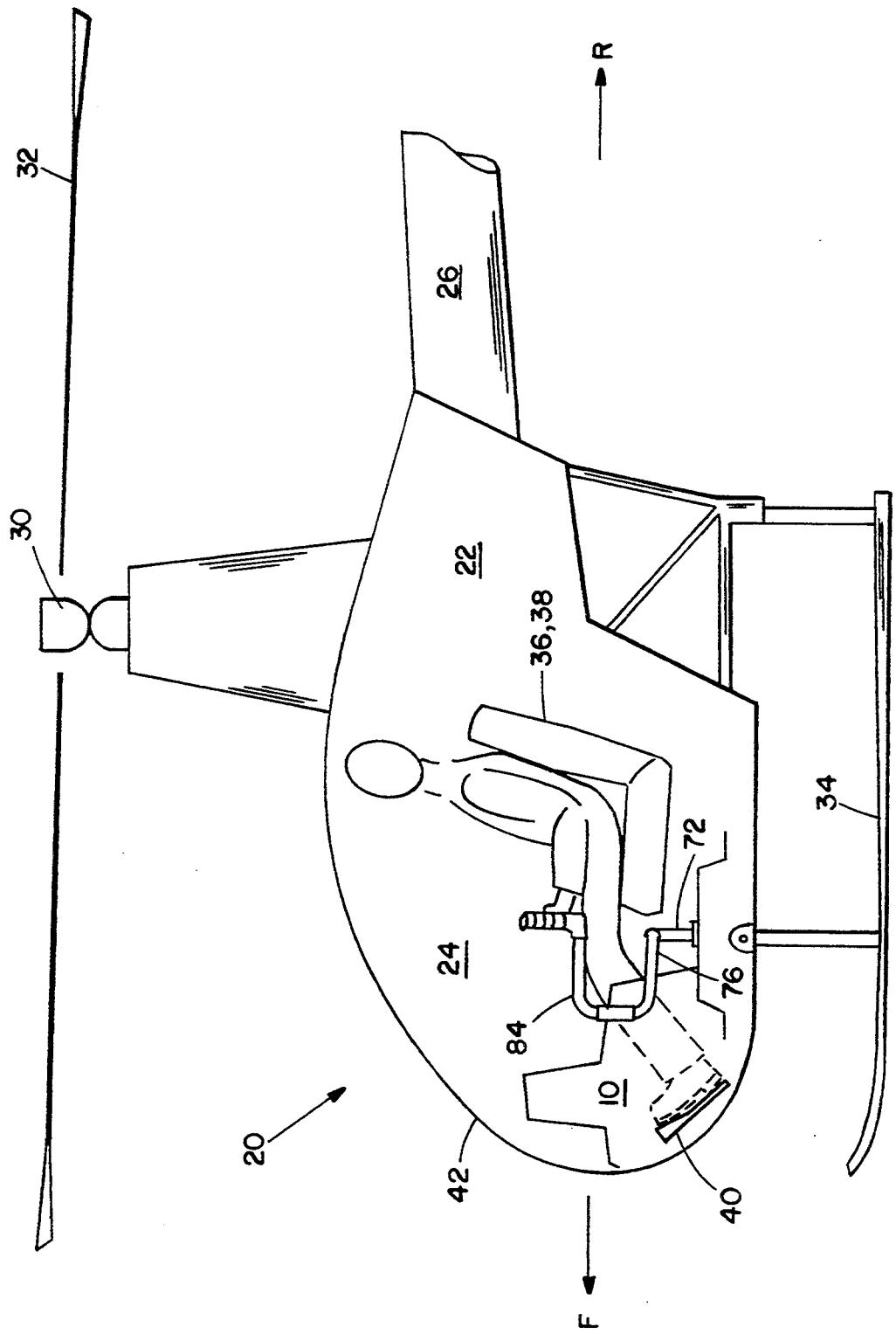
FIG. 5 is a side view thereof.

FIGS. 3, 4 and 5 disclose a helicopter 20 having a fuselage 22 containing an engine, gear box, fuel tank, etc., located aft or rearwardly of the main cockpit, generally designated 24. The above-mentioned console 10 is located in the cockpit. A conventional tail boom 26, rotor mast 28, rotor hub 30, mounting a two blade rotor 32 will be seen. A tail rotor (not seen) is attached to the tail boom 26 in conventional manner. A conventional landing skid 34 supports the helicopter on the ground. A pair of seats 36, 38 are located in the cockpit, one each on each side of the central axis e. The cockpit is enclosed by a conventional bulbous windshield 42. Floor pedals 40 are located in the cockpit for conventional rudder control.

As representative of the prior art, FIG. 1 shows a control stick assembly similar to that disclosed in U.S. Pat. No. 4,114,843 to Robinson. The single, vertically oriented control stick 45 extends downwardly through an opening in the lower portion of the console 10, passing through an opening 46, and there joined to gimble rings, journals, and the like (not shown), which, in turn, are connected to the aircraft controls such as the rudder, ailerons and the cyclic controls of the rotor. Reference may be had to the above-identified Robinson patent for such structure. At the upper end of the stick 45, a cross bar 50 is attached by way of a pivotal hinge 52. The cross bar tilts freely in a vertical plane in the directions of the arrows designated u and d. The stick does not rotate about its vertical axis. The cross bar portions 50, 52 each have attached to it hand grips 54, 56. In operation, the cross bar may be pivoted about the axis 53 of the hinge 53 to raise and/or lower the grips 54, 56. When one goes up, the other goes down. By pushing or pulling on the grips, the control stick is moved forwardly or rearwardly, moving of the aircraft control mechanism or surfaces accordingly. The stick 45 can be tilted left and right relative to the central axis a to further actuate the attached control linkage (not seen) best in the general area 47. An elastomeric boot 60 (shown in elevated position) may be positioned over the opening 46, to keep it clean.

One of the problems presented by the prior art apparatus is that the centrally located vertical stick 45 impairs access to the main instrument panel 12. Secondly, together with the cross bars 50, 52. The stick 45 blocks visibility of the instrument panel displays. Thirdly, when one grip 54 or 56 is moved up or down, the other automatically moves in the opposite direction. This often places the second grip out of convenient grasp for a pilot or copilot of differing as well as of same stature.

Referring next to FIGS. 2–5, Applicants control mechanism will now be described. As with the prior art, the mechanism is intended to effect lateral and longitudinal movement of the aircraft which has a forward end designated by the arrow F and a rearward end designated by the arrow R. A central axis a extends lengthwise of the aircraft. Portions of the control mechanism, generally designated 70, extend on both sides of this axis. A vertically extending short stub 72 has its lower end is engagable with the conventional aircraft control means of the type currently in usage and located below the cockpit floor or console. Applicants' dual control mechanism 70 may be installed directly in new aircraft or may be retrofit to existing aircraft by means hereinafter to be described. A cross bar 74 is secured to the upper end of the stub 72 and extends transversely on both sides of the central axis a near the floor. A pair of arcuate lower members 76 extend from the cross bar 74, one being located on each side of the axis of the aircraft. While they are shown integrally connected to the cross bar 74. The lower members 76 may be made separately and joined as, for example, at the elbows 78 or elsewhere as will be described hereinafter. The lower members 76 extend toward the forward end F of the aircraft and lie in a plane substantially parallel with the axis a. The lower members then curve upwardly at 80 and terminate in distal ends 82.

A positioning arm 84 is secured to the distal end of each lower member 76. The positioning arms extend toward the rearward end R of the aircraft. A hand grip 86 is secured to each positioning arm.

As will be seen in FIG. 9, means are provided for adjustably securing the grip 86 to the arm 84. It includes a circular extension 88 extending from the grip which is rotatably received within the arm 84 for adjustment about the axis g. A thumb screw 90, set screw or other equivalent means is threaded into the arm 84 and may be received in one of a plurality of recesses 92 in the extension 88 of the grip. When the screw is backed off, the grip is free to be rotated into any other desired position about the axis g.

Referring next to FIG. 6, each of the means 82 for pivotally mounting the positioning arms 84 on the lower members 76 comprises a downwardly extending arcuate projection or hinge member 92 which fits between the upwardly extending ears 94 of a mating hinge 96 which, in turn, extends upwardly from a stub 98 which is received and fixed in the lower member 76. A pin 100 passes through appropriate washers (not designated) and is secured by a nut 102 in any desired position of adjustment.

By backing off the nut 102, each arm 84 may be held loosely relative to the member 76 such that when it is not in use, it may be allowed to hang in a lowered position closer to the floor permitting better access to the passenger seats.

In like manner, the best access is by raising the arm to vertical. By this construction, either of the arms 84 may be independently adjusted heightwise by the pilot or copilot independently of the heightwise location of the other arm. Alternately, by tightening the nut 102, the upper arm may be fixed in a selected height position according to the pilot's preference. If the nut 102 were replaced with a manual clamp, such friction adjustment could be selected by the individual pilot.

Likewise, the grips 86 themselves may be adjusted about the axis g to a desired angular orientation. When assembled, the pivot mechanisms may be covered by boots 101 for cosmetic purposes.

Referring next to FIG. 7, mechanism generally designated 104 will be seen for securing the stub to the aircraft control mechanism below the console. If, for example, it is desirable to retrofit existing aircraft with Applicants' new dual control mechanism, it may be done so simply. The stub 72 is secured to an upwardly extending plug 106 which is an internal double cylindrical member which fits respectively within the stub 72 and a tubular member 107 secured to the controls beneath the floor. The member 107 may be the original stick 45 cut off. The mechanism is locked together by screws 112 passing through arcuate, apertured plates 114, 116. When not a retrofit, the upper portion of the plug 106 is welded to the cross bar 74.

Figure 2:
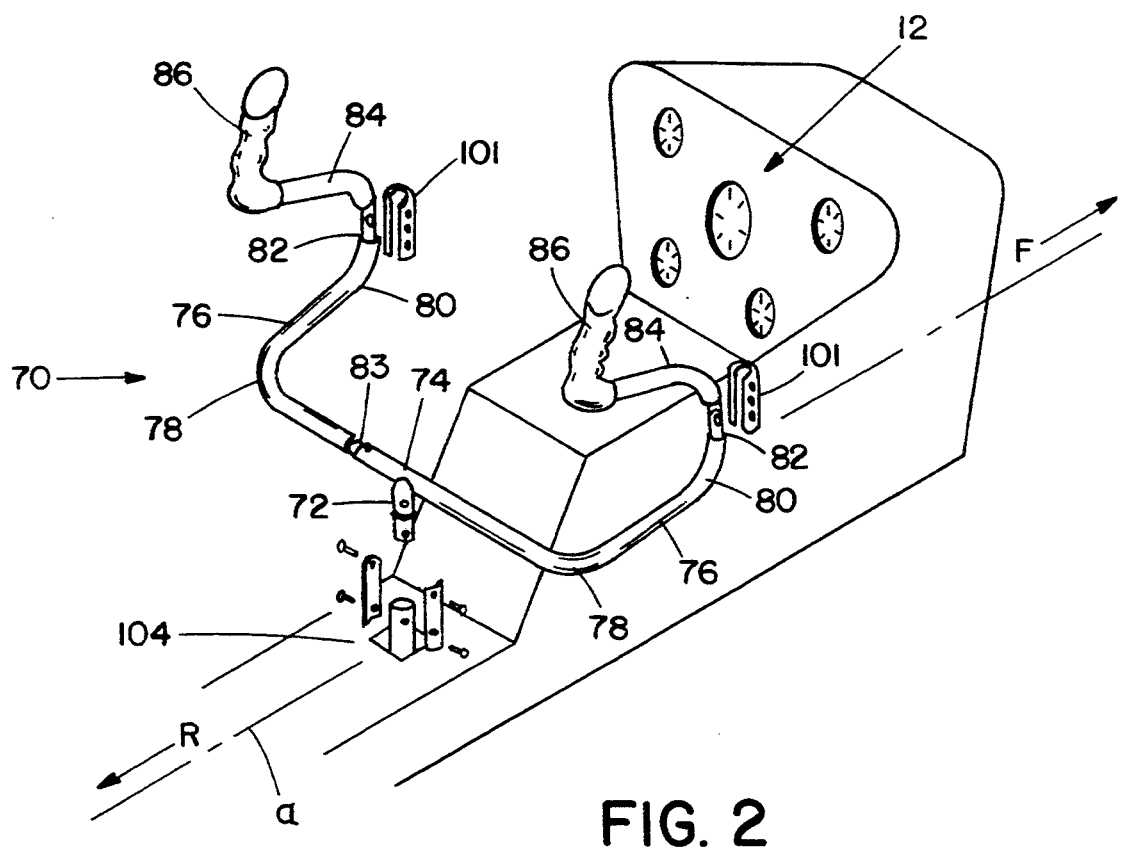
FIG. 2 is a perspective view similar to FIG. 1 showing a dual control mechanism made in accordance with the present invention.

As will be seen in FIG. 2, the lower arms 76 may be separated from one another and removed for cleaning the aircraft or other purposes by connecting means similar to that shown in FIG. 9 for securing the grip to its arm 84. Although only one of the lower arcuate members 76 is shown to be removable, the other may be removed as well.

Figure 10:
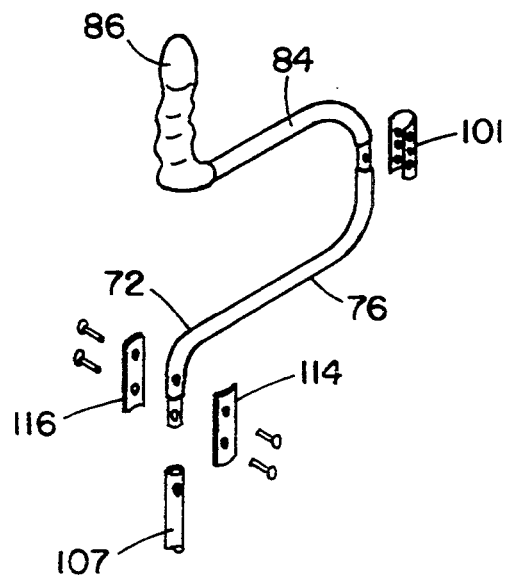
FIG. 10 is a view similar to FIG. 2 but showing a single control mechanism made in accordance with the present invention.

Referring next to FIG. 10, the upper positioning arm 84 and the lower arcuate member 76 may be attached by the retrofit mechanism to a single stick which is centered relative to a pilot. The mechanism is the same as that described with reference to FIG. 7. The advantage of a hinged positioning arm 84 is that it allows better access (both ingress and egress) and comfort to the passenger. It enables planar motion of the hand grip throughout the arc travel of the stick. It also allows full clearance of the grip with regard to the legs at the extreme range of motion of the stick. In most helicopters, the stick comes close to, or sometimes physically engages, the knees of the pilot at the limit of travel. The same is true of the single sticks used in fixed wing aircraft.

Figure 11:
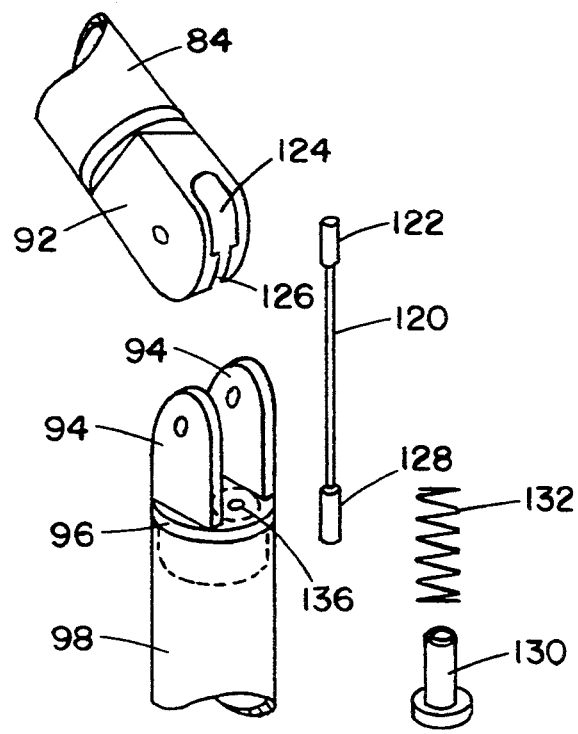
FIG. 11 is an exploded detail view of a counterbalance mechanism for the pivoted arm.

Referring next to FIG. 11, a mechanism will be described for counterbalancing the weight of the positioning arm 84. FIG. 11 shows some of the mechanism described with reference to FIG. 6. It includes the positioning arm 84, the hinge member 92 which cooperates with the ears 94 of the mating hinge 96, to produce the hinge joint between the upper positioning arm 84 and the lower arcuate member 76. A cable 120 has an enlarged upper cylindrical end 122 which is engagable in a cable retainer slot 124 having a lower milled groove 126 against the rear of which the enlarged end 122 is secured. The cable passes downwardly through a bore 136 in the plate 134 which supports the upstanding ears 94. A coiled compression spring 132 surrounds the cable and abuts the lower face of the plate 34 beneath the bore 136. The lower enlarged end 128 of the cable 120 fits within a cable retainer 130 such that the spring 132 is in compression between the retainer 130 and the lower face of the plate 134 thus placing the cable 120 in tension tending to pivot the upper control arm upwardly or in a clockwise direction as viewed in FIG. 5.

Other forms of counterbalancing may be employed as, for example, a rotory spring or similar force-resisting elements to cause the upper arm to balance at any heightwise position regardless of the selected friction in the hinge. Depending upon the force of the spring selected, the arm could, for example, always return to the uppermost position or remain in any desired position depending upon the friction of the hinge.

The claimed invention is:

1. A control mechanism to effect lateral and longitudinal movement of an aircraft having a forward end, a rearward end and a central axis with portions of the control mechanism extending on both sides of the axis comprising:
   a. a vertically extending short stub with its lower end engagable with conventional aircraft control means for effecting movement of the aircraft in response to movement of the stub;
   b. a cross bar secured to the upper end of the stub and extending transversely of the central axis;
   c. a pair of arcuate lower members extending from the cross bar, one on each side of the axis of the aircraft, toward the forward end of the aircraft substantially parallel with the axis, then curving upwardly and terminating in a distal end;
   d. a positioning arm secured to the distal end of each lower member and extending toward the rearward end of the aircraft; and
   e. a hand grip secured to each positioning arm.

2. Mechanism according to claim 1 wherein at least one of the arcuate lower members is releasably secured to the cross bar to permit its removal.

3. Mechanism according to claim 1 wherein there are means for pivotally mounting each positioning arm on its associated lower member to permit independent heightwise location of each hand grip relative to the stub independent of the height of the other grip.

4. Mechanism according to claim 1 wherein there are means for pivotally mounting each hand grip on its associated positioning arm to permit independent angular adjustment of the grip relative to the central axis.

5. Mechanism according to claim 1 wherein mechanism is provided to counterbalance each positioning arm on its associated arcuate lower member.

6. A control mechanism to effect lateral and longitudinal movement of an aircraft having a forward end, a rearward end and a central axis with portions of the control mechanism extending on both sides of the axis comprising:
   a. a vertically extending short stub with its lower end engagable with conventional aircraft control means for effecting movement of the aircraft in response to movement of the stub;
   b. a cross bar secured to the upper end of the stub and extending transversely of the central axis;
   c. a pair of arcuate lower members extending from the cross bar, one on each side of the axis of the aircraft, toward the forward end of the aircraft substantially parallel with the axis, then curving upwardly and terminating in a distal end;

d. a positioning arm secured to the distal end of each lower member and extending toward the rearward end of the aircraft;
e. a hand grip secured to each positioning arm; and
f. means for pivotally mounting each positioning arm on its associated lower member to permit independent heightwise location of each hand grip relative to the stub independent of the height of the other grip.

7. Mechanism according to claim 6 wherein at least one of the arcuate lower members is releasably secured to the cross bar to permit its removal.

8. Mechanism according to claim 6 wherein there are means for pivotally mounting each hand grip on its associated positioning arm to permit independent angular adjustment of the grip relative to the central axis.

9. Mechanism according to claim 6 wherein mechanism is provided to counterbalance each positioning arm on its associated arcuate lower member.

10. A control mechanism to effect lateral and longitudinal movement of an aircraft having a forward end, a rearward end and a central axis with portions of the control mechanism extending on both sides of the axis comprising:
   a. a vertically extending short stub with its lower end engagable with conventional aircraft control means for effecting movement of the aircraft in response to movement of the stub;
   b. a cross bar secured to the upper end of the stub and extending from the stub transversely of the central axis;
   c. a pair of arcuate lower members extending from the cross bar, one on each side of the axis of the aircraft, toward the forward end of the aircraft substantially parallel with the axis, then curving upwardly and terminating in a distal end;
   d. a positioning arm secured to the distal end of each lower member and extending toward the rearward end of the aircraft;
   e. a hand grip secured to each positioning arm; and
   f. means for pivotally mounting each hand grip on its associated positioning arm to permit independent angular adjustment of the grip relative to the central axis.

11. Mechanism according to claim 10 wherein at least one of the arcuate lower members is releasably secured to the cross bar to permit its removal.

12. Mechanism according to claim 10 wherein there are means for pivotally mounting each positioning arm on its associated lower member to permit independent heightwise location of each hand grip relative to the stub independent of the height of the other grip.

13. Mechanism according to claim 10 wherein mechanism is provided to counterbalance each positioning arm on its associated arcuate lower member.

14. A control mechanism to effect lateral and longitudinal movement of an aircraft having a forward end, a rearward end and a central axis comprising:
   a. a vertically extending short stub with its lower end engagable with conventional aircraft control means for effecting movement of the aircraft in response to movement of the stub;
   b. an arcuate lower member having a portion extending vertically from the stub and a second portion extending horizontally toward the forward end of the aircraft substantially parallel with the axis, then curving upwardly and terminating in a distal end;
   c. a positioning arm secured to the distal end of the lower member and extending horizontally toward the rearward end of the aircraft parallel to the axis and to second portion of the lower member; and
   d. a hand grip secured to the positioning arm.

15. Mechanism according to claim 14 wherein there are means for pivotally mounting the positioning arm on the lower member to permit heightwise location of the hand grip relative to the stub.

16. Mechanism according to claim 14 wherein there are means for pivotally mounting the hand grip on the positioning arm to permit independent angular adjustment of the grip relative to the central axis.

17. Mechanism according to claim 14 wherein mechanism is provided to counterbalance the positioning arm on the arcuate lower member.

18. A control mechanism to effect lateral and longitudinal movement of an aircraft having a forward end, a rearward end and a central axis comprising:
   a. a vertically extending short stub with its lower end engagable with conventional aircraft control means for effecting movement of the aircraft in response to movement of the stub;
   b. an arcuate lower member having a portion extending vertically from the stub toward the forward area of the aircraft substantially parallel with the axis, then curving upwardly and terminating in a distal end;
   c. a positioning arm secured to the distal end of the lower member and extending horizontally toward the rearward end of the aircraft parallel to the axis and to second portion of the lower member; and
   d. a hand grip secured to the positioning arm.

19. Mechanism according to claim 18 wherein mechanism is provided to counterbalance the positioning arm on the arcuate lower member.

* * * * *